July 30, 1968  J. J. GEARHART  3,394,949
TRAILER STABILIZER

Filed Jan. 30, 1967  2 Sheets-Sheet 1

INVENTOR
JESS J. GEARHART
BY Joseph G. Werner

ATTORNEYS

July 30, 1968  J. J. GEARHART  3,394,949
TRAILER STABILIZER
Filed Jan. 30, 1967  2 Sheets-Sheet 2
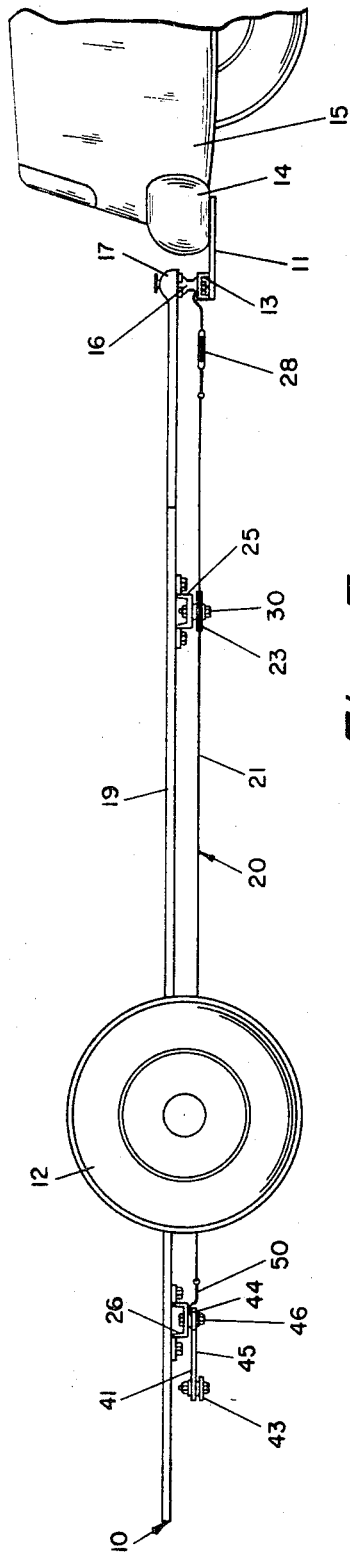
INVENTOR
JESS J. GEARHART
BY *Joseph G. Werner*
ATTORNEYS

# United States Patent Office 3,394,949
Patented July 30, 1968

3,394,949
TRAILER STABILIZER
Jess J. Gearhart, 2022 Monroe Ave.,
Beloit, Wis. 53511
Filed Jan. 30, 1967, Ser. No. 612,685
6 Claims. (Cl. 280—446)

ABSTRACT OF THE DISCLOSURE

Apparatus for stabilizing motor vehicle drawn trailers having two taut cables connected in laterally spaced relation to the rear of the towing vehicle and extending rearwardly to cable guides mounted under the trailer near the front corners thereof, thence crossing diagonally under the trailer and being attached to pivotable linkage mounted behind the trailer wheels near the rear of the trailer for restraining sidesway at points of contact both forwardly and rearwardly of the wheels of the trailer.

Background of the invention (a) *Field of the invention.*—Sidesway or "fishtailing" of trailers caused by wind, passing vehicles and uneven or slippery road conditions is a common and very dangerous problem. Fishtailing trailers are a frequent cause of highway accidents and pose a serious hazard not only to trailer owners, but to all users of our highways. The problem has become more serious in recent years because of the marked increase in the public use of boat and camping trailers. Safe operation of automobile-trailer combinations at reasonable highway speeds requires that the automobile and trailer function as an integral unit, with the trailer restrained from pivoting about its wheels except as directed by the towing vehicle.

(b) *Description of the prior art.*—Presently, there are a number of trailer stabilizers on the market which take a variety of forms, but typically, the known devices act on the trailer only in front of the trailer wheels.

Summary of the invention

My trailer stabilizer constitutes an important improvement over known devices in that it provides restraining forces both in front of and behind the wheels of a trailer where the fishtailing is the most pronounced. The diagonally disposed cables crossing under the trailer act at both the front and rear of the trailer providing a force couple to control the trailer from swaying in either direction. The pivotable restraining linkage mounted on the bottom of the trailer at the rear end thereof permits turning without losing the controlling forces.

Accordingly, an object of my invention is to provide a device for connecting a trailer to a motor vehicle for effectively restraining the trailer from pivoting about its wheels except as directed by the towing vehicle.

A distinguishing feature of my invention is that it controls trailer sway by applying stabilizing forces both in front of and behind the wheels of the trailer.

Other objects, features and advantages of my invention will become apparent from the following detailed description taken in conjunction with the accompanying drawings showing a preferred exemplary embodiment of my invention.

Brief description of the drawings

FIG. 2 is a side view of my stabilizing device on a trailer.

FIG. 3 is an enlarged side view of the cable connection at the trailer hitch.

FIG. 4 is an enlarged side view of a pulley wheel.

FIG. 5 is an enlarged side view of connecting means for the sway restraining linkage.

Description of the preferred embodiment

Figure 1:
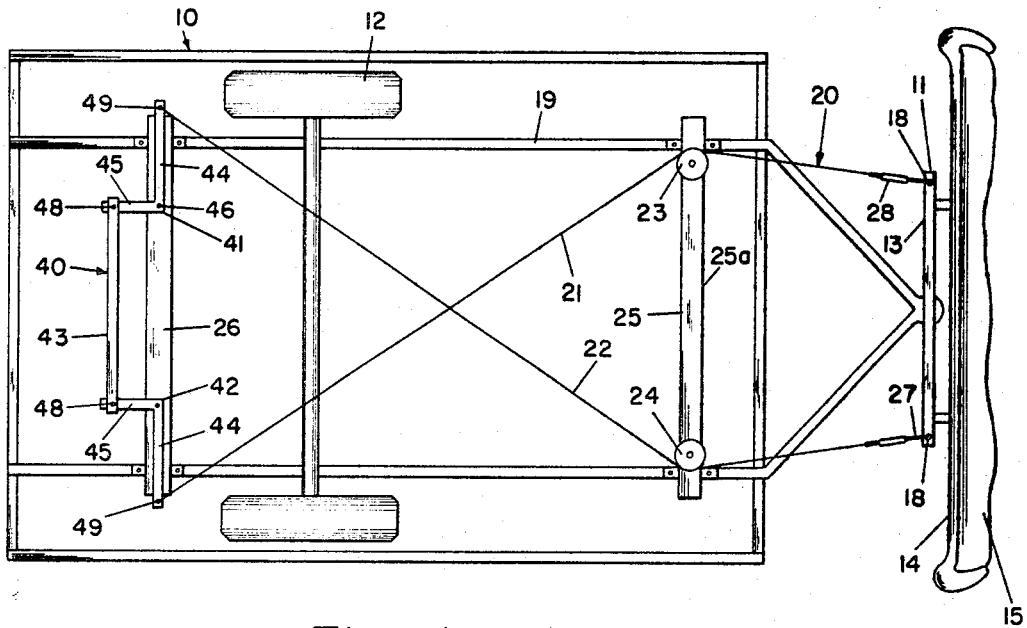
FIG. 1 is a bottom view of my stabilizing device looking at the underside of a trailer.

Referring now more specifically to the drawings, wherein like numerals refer to like parts throughout the several views, FIG. 1 shows my stabilizing device 20 mounted on the underside of a two-wheeled trailer 10. Generally, my stabilizer comprises a pair of cables 21 and 22 connected respectively to the ends of an elongate trailer hitch 11 and passing rearwardly through cable guides 23 and 24 which are mounted in a horizontal position on a transverse channel member 25 affixed to the underside of the trailer forwardly of the trailer wheels 12. The cables then cross diagonally and extend to opposite rear corners of the trailer where they are connected to sway restraining linkage 40 mounted on a second transverse channel member 26. Sway restraining linkage 40 reacts to any pivoting of trailer hitch 11 from its normal perpendicular alignment, as when the towing vehicle is turning in the manner shown in FIG. 6, keeping a desired tension on the cables 21 and 22.

Trailer hitch 11 is of the conventional ball type commonly used on automobiles to tow trailers and preferably comprises an elongate transverse member 13 mounted in a fixed horizontal position behind the rear bumper 14 of an automobile 15. The hitch 11 has a typical central ball type swivel post 16 adapted to be engaged by a universal trailer coupling socket 17. Cable mounting holes 18 are provided at each end of the transverse member 13 of the trailer hitch 11 for receiving cable connecting hooks 27.

As best seen in FIG. 3, cables 21 and 22 are connected to trailer hitch 11 by the hooks 27 which have a threaded shank 27*a* and a hook portion 27*b* which is adapted to be removably inserted into the cable mounting holes 18 in trailer hitch 11. Threaded shanks 27*a* screw into turnbuckles 28. Cables 21 and 22 are connected to eye bolts 29 having threaded shanks 29*a* engaging turnbuckles 28.

Cables 21 and 22 are preferably high strength, stranded steel. In practice, I have found airplane type cable having a test strength of about 4200 pounds suitable for average boat trailers and camping trailers. Greater strengths, of course, may be required with heavier house trailers and the like.

Forward transverse member 25 is preferably constructed of a steel channel and is affixed to the trailer frame 19 by bolts, welding or other suitable means forwardly of the wheels 12 near the front end of the trailer. Preferably, the flat web face 25*a* is downwardly disposed.

Cable guides, shown in the drawings in the form of pulley wheels 23 and 24, are rotatably mounted on the downwardly disposed web face 25*a* of forward transverse member 25 near the ends thereof, respectively. As shown in FIG. 4, a bolt 30 is provided for mounting each pulley wheel and is fixedly secured to forward transverse member 25 by a lock nut 31.

Rear transverse member 26 is similar to member 25 and affixed to the trailer frame 19 in substantially the same way but is mounted behind the wheels 12 near the rear end of the trailer 10. Tranverse member 26 provides a base for mounting sway restraining linkage 40. It should be understood that while both forward and rear transverse members 25 and 26 have been found to be particularly suitable in most instances, pulley wheels 23 and 24 and linkage 40 may be mounted directly on the trailer frame of some trailers.

Sway restraining linkage, shown generally at 40 in FIGS. 1 and 5, comprises three basic members; a pair of rigid cable connector members 41 and 42, and a tie member 43 connecting members 41 and 42 together for coordinating their movement. Preferably, cable connector members 41 and 42 are generally L-shaped members having a long leg 44 and a shorter leg 45. The cable connector members 41 and 42 are pivotably mounted on transverse member 26 by connection means such as pivot bolts 46 shown in FIG. 5. Members 41 and 42 should be spaced from the transverse member 26 by a spacer washer 47 to facilitate pivoting. The tie member 43 is pivotably attached to the rear ends of legs 45 of the cable connector members 41 and 42 by pivot bolts 48.

When the sway restraining linkage 40 is mounted on a trailer, the L-shaped cable connector members 41 and 42 are disposed with their longer legs 44 generally parallel to the transverse member 26 and project outwardly perpendicular to the centerline of the trailer while the shorter legs 45 project generally to the rear. The tie bar 43 is parallel to transverse member 26. The connector members 41 and 42 each have a hole 49 near the outer end of their longer legs 44 for connecting cables 21 and 22. As best seen in FIG. 5, the cables 21 and 22 may be provided with hooks 50 for attachment in holes 49 of the cable connecting members 41 and 42.

In order that the cables 21 and 22 will remain taut during turning of the vehicle and trailer, it is important that the distance from pivotable connecting means 46 to the cable connections at 49 be equal to the distance from the ball post 16 of the trailer hitch 11 to the point of attachment 18 of the cables to the motor vehicle.

While the particular trailer hitch 11 shown in the drawings for exemplification has an elongate transverse member 13 to which cables 21 and 22 are connected, it is understood that my stabilizer 10 may be used in conjunction with other type hitches which do not have such a transverse member by merely securely attaching the cables to the bumper or undercarriage of the motor vehicle at the proper lateral distance from the ball post of the hitch.

Connection of my novel stabilizing device to a motor vehicle is very simple and can be accomplished quickly without special tools. The trailer is, of course, first hitched to the motor vehicle in the usual manner by securing the trailer coupling socket 17 on the ball post 16 of the trailer hitch 11 and the trailer and vehicle should be brought into general alignment if they are not already so aligned. The cable hooks 27 are then inserted into the cable mounting holes 18 in the trailer hitch 11 as best seen in FIG. 3 and the turnbuckles 28 are tightened. The turnbuckles 28 should be tightened only until the cables 21 and 22 are taut but the cables should not be stressed to any great extent. The legs 44 of the cable connector members 41 and 42 should be parallel to the transverse member 26 when the cables are tightened with the vehicle and trailer in alignment.

Figure 6:
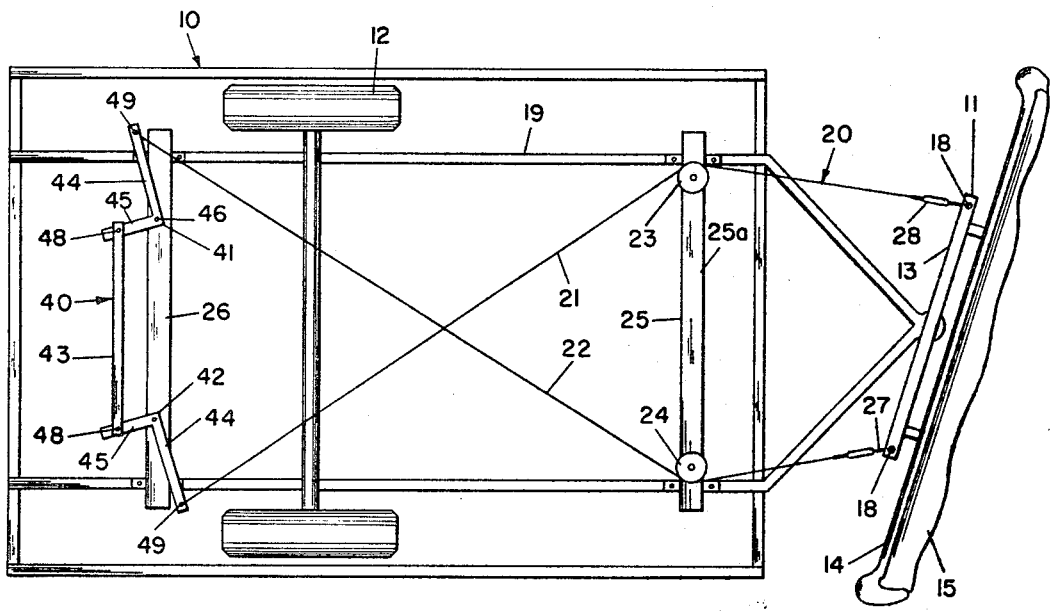
FIG. 6 is a bottom view of my stabilizing device on the underside of a trailer hitched to a turning vehicle.

The operation of my novel stabilizing device is readily apparent from FIGS. 1 and 6. As the automobile or other towing vehicle and the trailer are traveling forward in a generally straight line, the taut cables exert opposing inward restraining forces on cable guide pulleys 23 and 24 at the front corners of the trailer. Cables 21 and 22, crossing diagonally under the trailer, exert similar inwardly directed force components at the ends of the sway restraining linkage 40 at the rear corners of the trailer. The trailer is therefore controlled both fore and aft of the wheels to effectively restrict fishtailing and sidesway.

When the towing vehicle turns, as shown in FIG. 6, the pivoting of the sway restraining linkage 40 permits both cables to remain taut during the turn. Thus, effective sidesway control is provided under all normally encountered driving conditions. When the towing vehicle resumes a straight course, the system is again brought into symmetry as shown in FIG. 1.

This invention is not limited to two-wheeled trailers, but may be used on all types and sizes of trailers for controlling and essentially eliminating dangerous fishtailing which has often caused drivers to lose control of the towing vehicle.

It is understood that the present invention is not confined to the particular construction and arrangements of parts herein illustrated and described, but embraces all such modified forms thereof as come within the scope of the following claims.

I claim:
1. A stabilizer for a wheel-supported trailer adapted to be swivelably connected to a towing vehicle by a trailer hitch, said stabilizer comprising:
 (a) a pair of cable guides affixed under the front and near the sides of the trailer,
 (b) sway restraining linkage having,
  (i) a pair of rigid members pivotably attached by first connecting means to the bottom of the trailer rearwardly of the wheels thereof and near the sides of the trailer and then being equally spaced from the longitudinal centerline of the trailer,
  (ii) a tie member pivotably connected to said pair of rigid members in spaced relation from said first connecting means for coordinating the movement of said rigid members,
 (c) a pair of cables adapted to be connected to the rear of the towing vehicle in laterally spaced relation to each other and extending rearwardly therefrom under the trailer to said cable guides and thence diagonally towards opposite sides of the trailer and being attached respectively to said rigid members in spaced relation from said first connecting means.

2. The stabilizer as specified in claim 1 wherein the distance from said first connecting means on each of said rigid members to the point of attachment of said cables to said rigid members is substantially equal to the distance from the center of the trailer hitch to the point of lateral attachment of said cables to the towing vehicle.

3. The stabilizer as specified in claim 1 wherein said rigid members are substantially L-shaped having first and second legs, said first leg of each of said rigid members extending substantially outward from said first connecting means at a right angle to the centerline of the trailer and said tie member being pivotably connected to said second leg.

4. The stabilizer as specified in claim 1 wherein turnbuckles are provided in each of said cables to facilitate connection of said cables and for adjusting the tension therein.

5. The stabilizer as specified in claim 1 wherein a rear transverse member having a substantially flat downwardly disposed web face is affixed to the underside of the trailer rearwardly of the wheels thereof, said rigid members being pivotably attached to said transverse member by said first connecting means.

6. The stabilizer as specified in claim 1 wherein said cable guides comprise pulley wheels rotatably mounted in a substantially horizontal position near the front of and at opposite sides under the trailer.

References Cited

UNITED STATES PATENTS

| 2,612,382 | 9/1952 | Landis | 280—456 |
| 2,691,533 | 10/1954 | Koontz | 280—405 |
| 2,756,072 | 7/1956 | Koontz | 280—405 |
| 3,116,074 | 12/1963 | Koontz | 280—405 |
| 3,284,097 | 11/1966 | Koontz | 280—405 |
| 3,305,246 | 2/1967 | Gonczy et al. | 280—446 |
| 3,338,595 | 8/1967 | Bogie | 280—446 |
| 3,362,727 | 1/1968 | Malherbe | 280—446 |

LEO FRIAGLIA, *Primary Examiner.*